(12) United States Patent
Bulin

(10) Patent No.: US 7,703,716 B2
(45) Date of Patent: Apr. 27, 2010

(54) HINGED DEVICE FOR DOORS OF AN AIRCRAFT NACELLE AND NACELLE EQUIPPED WITH SAID HINGED DEVICE

(75) Inventor: Guillaume Bulin, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 203 days.

(21) Appl. No.: 11/798,375

(22) Filed: May 14, 2007

(65) Prior Publication Data

US 2007/0267539 A1 Nov. 22, 2007

(30) Foreign Application Priority Data

May 16, 2006 (FR) .................................. 06 51760

(51) Int. Cl.
*B64D 29/00* (2006.01)
*B64D 29/08* (2006.01)

(52) U.S. Cl. ..................... 244/53 R; 244/129.4; 60/797; 60/798

(58) Field of Classification Search ................... 244/54, 244/53 R, 53 B, 129.5, 129.4, 110 B, 113, 244/110 A, 110 R; 137/15.1, 15.2; 60/226.2, 60/230, 797, 798

See application file for complete search history.

(56) References Cited

U.S. PATENT DOCUMENTS 2,445,131 A * 7/1948 Wartian .................... 244/129.5
3,935,674 A * 2/1976 Williams et al. ............... 49/212
3,994,094 A * 11/1976 Marzocco ..................... 49/212
5,072,898 A * 12/1991 Amelio ..................... 244/129.4
5,313,788 A * 5/1994 Wright et al. ........... 244/110 B
5,350,136 A 9/1994 Prosser et al.
6,220,546 B1 * 4/2001 Klamka et al. ........... 244/129.5
6,311,928 B1 * 11/2001 Presz et al. .............. 244/110 B
6,340,135 B1 * 1/2002 Barton ...................... 244/53 B
2005/0133667 A1 * 6/2005 Pahl ........................ 244/129.5

FOREIGN PATENT DOCUMENTS

FR 2 622 930 5/1989
GB 2 288 578 10/1995

* cited by examiner

*Primary Examiner*—Tien Dinh
*Assistant Examiner*—Richard R Green
(74) *Attorney, Agent, or Firm*—Young & Thompson

(57) ABSTRACT

A hinged device for at least one door (46.1, 46.2) of an aircraft nacelle (40), whereby the door is able to block an opening (44) that is made in the fairing of the nacelle, the device including a base to which is connected at least one door, able to occupy a first retracted state in which the base is located at least in part inside the nacelle and a second extended state in which the base is located outside the fairing of the nacelle so as to be able to move, in a direction that is essentially parallel to the longitudinal axis of the nacelle, outside of the nacelle by entraining the at least one door (46.1, 46.2) to release the opening (44) at least in part.

9 Claims, 4 Drawing Sheets

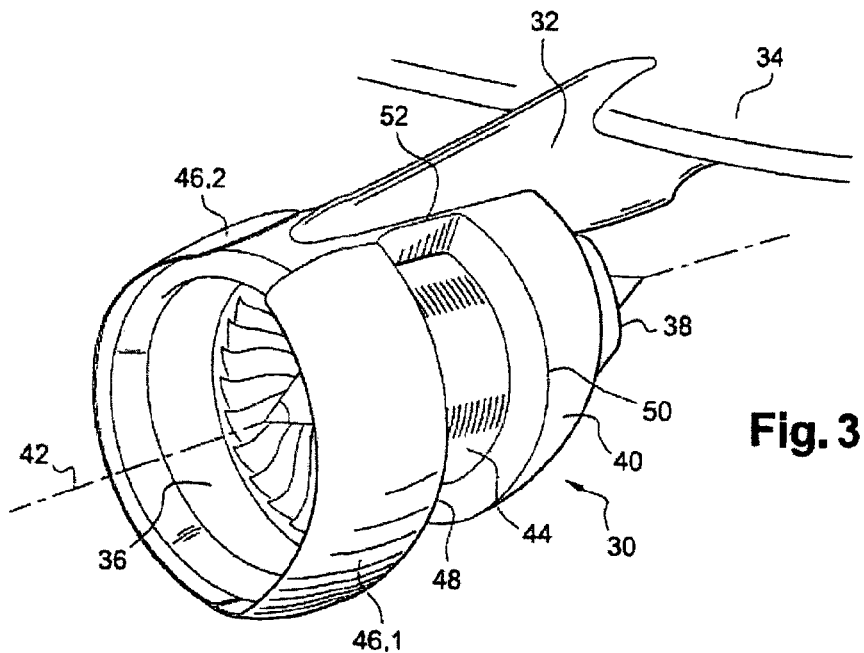
Fig. 3
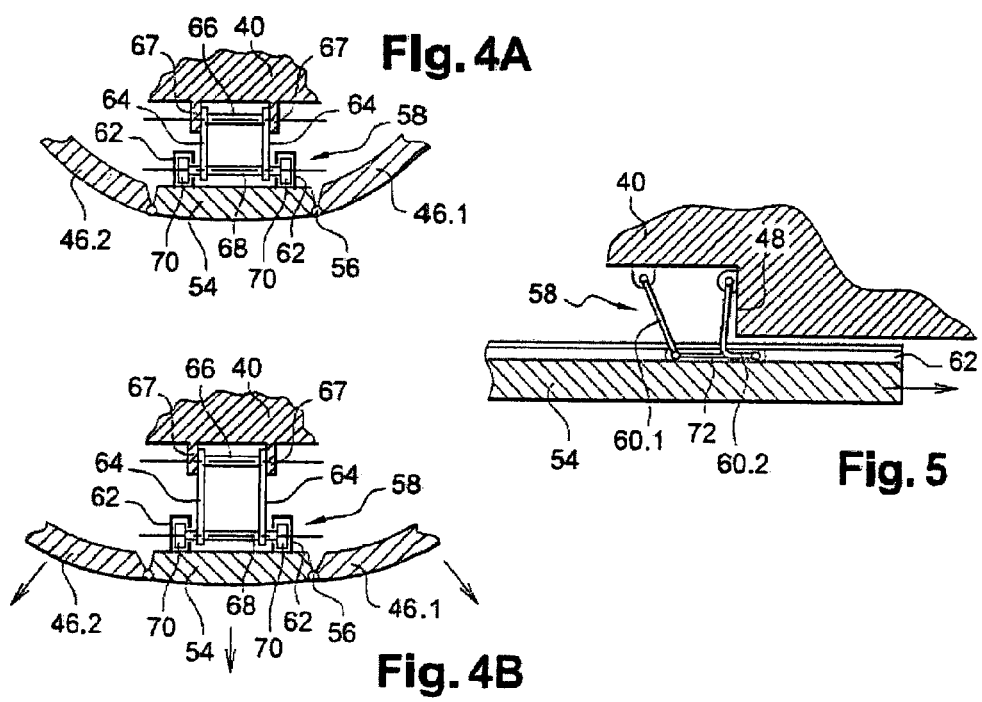
Fig. 4A
Fig. 4B
Fig. 5

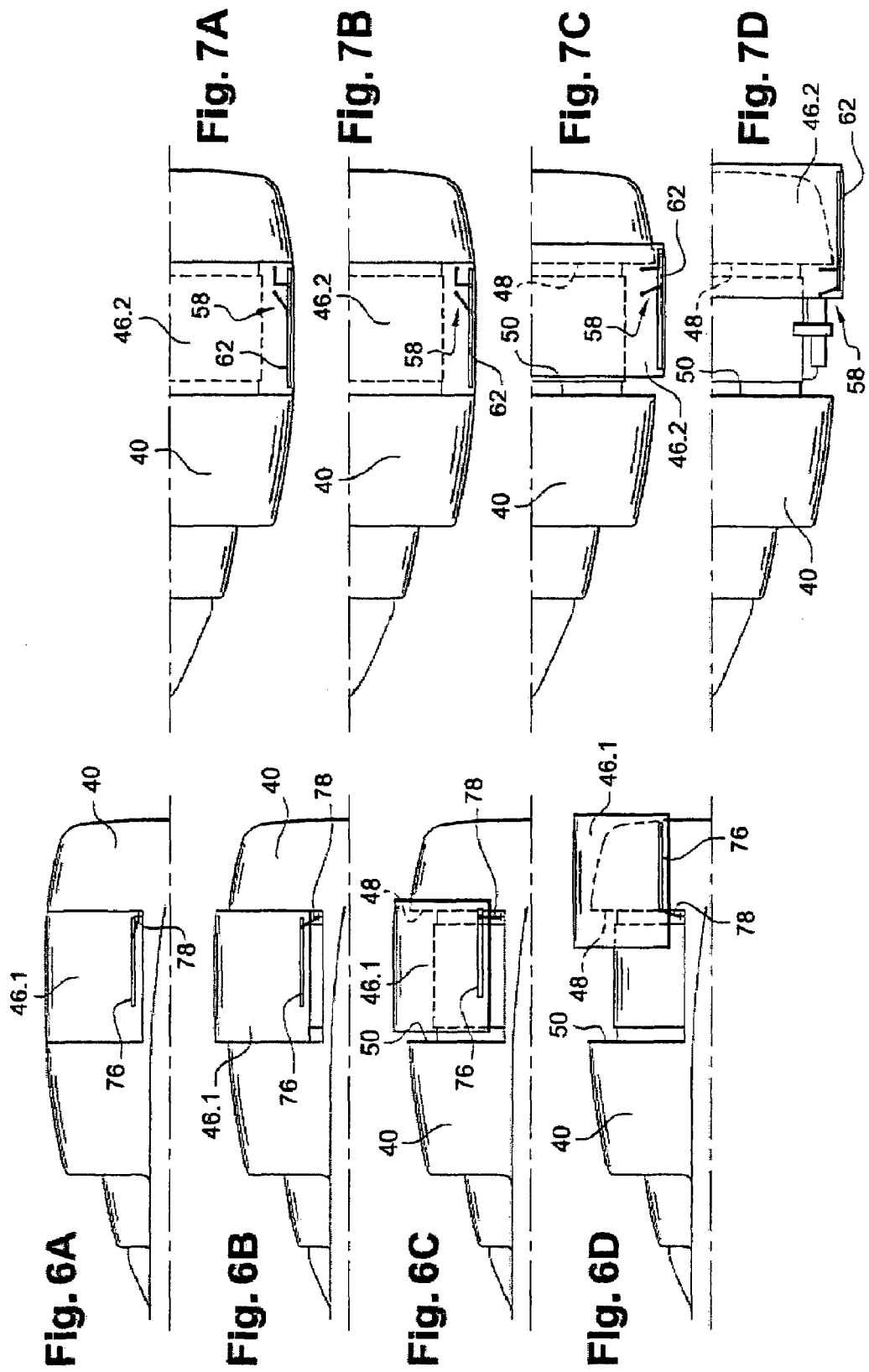

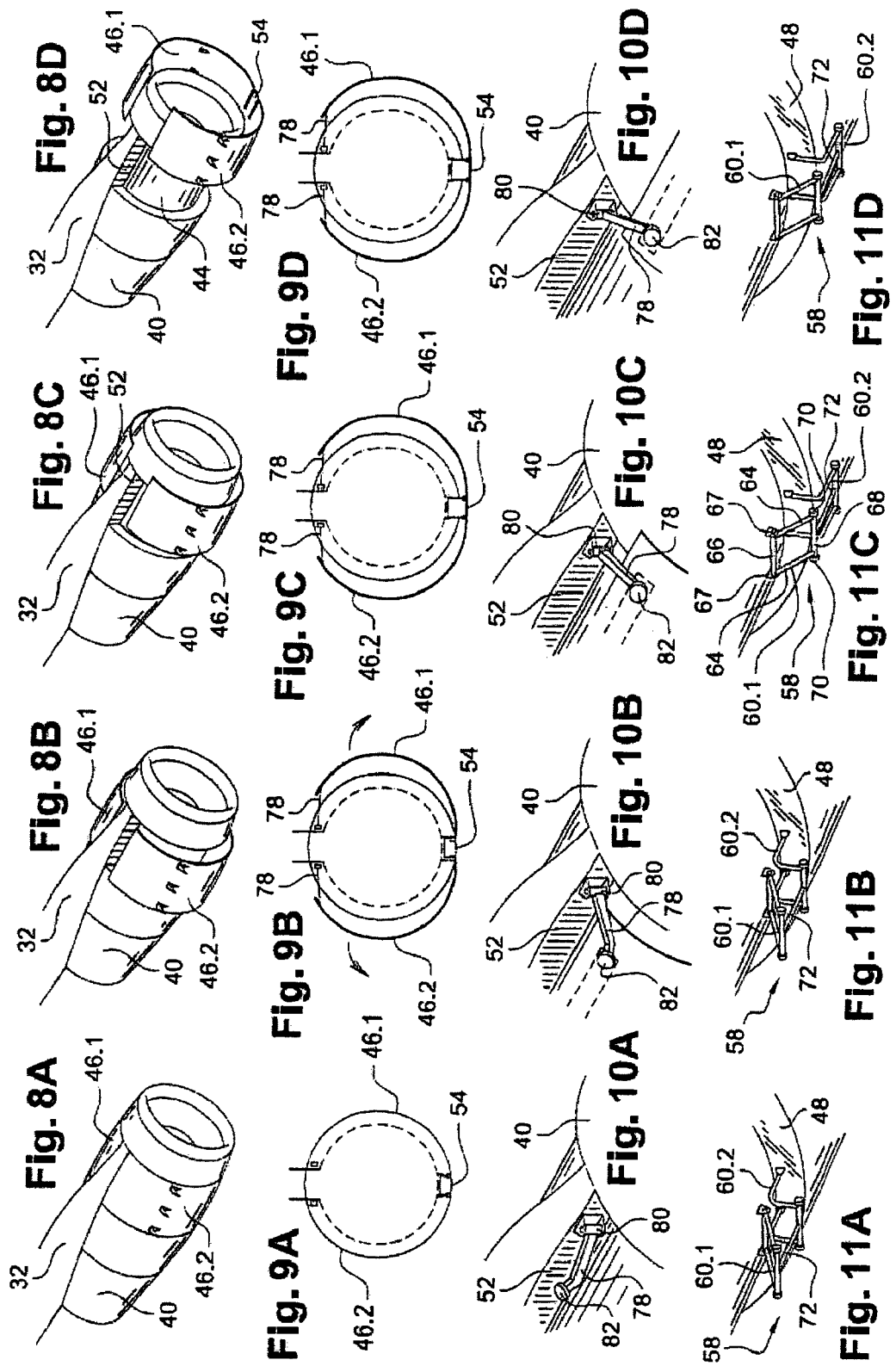

HINGED DEVICE FOR DOORS OF AN AIRCRAFT NACELLE AND NACELLE EQUIPPED WITH SAID HINGED DEVICE

BACKGROUND OF THE INVENTION

1. Field of the Invention

This invention relates to a hinged device for doors of an aircraft nacelle as well as an aircraft nacelle that is equipped with said hinged device.

2. Description of the Related Art

The aircraft engines are generally integrated inside a structure, called nacelle below, connected by connecting means to the aircraft, in particular by a mast to the wing.

This nacelle has several functions, in particular those to regulate and to control the movements of the air around and in the engine so as to optimize the aerodynamic flow, to protect the engine from the outside elements, to minimize noise pollution, to ventilate the internal zones, to participate in the dispersion of mechanical stresses of the engine, and optionally to support the thrust reverser systems.

Finally, the nacelle is to allow the daily maintenance and the maintenance of the engine and its components.

For this purpose, the nacelle comprises, at its outside surface, an opening that allows access to the inside of the nacelle and a moving part that can occupy at least two positions, a first so-called closed position in which said moving part is located in the extension of the outside surface of the nacelle so as to block said opening, and a second position in which it at least in part releases the opening. For the remainder of the description, the moving part is called a door.

Figure 1:
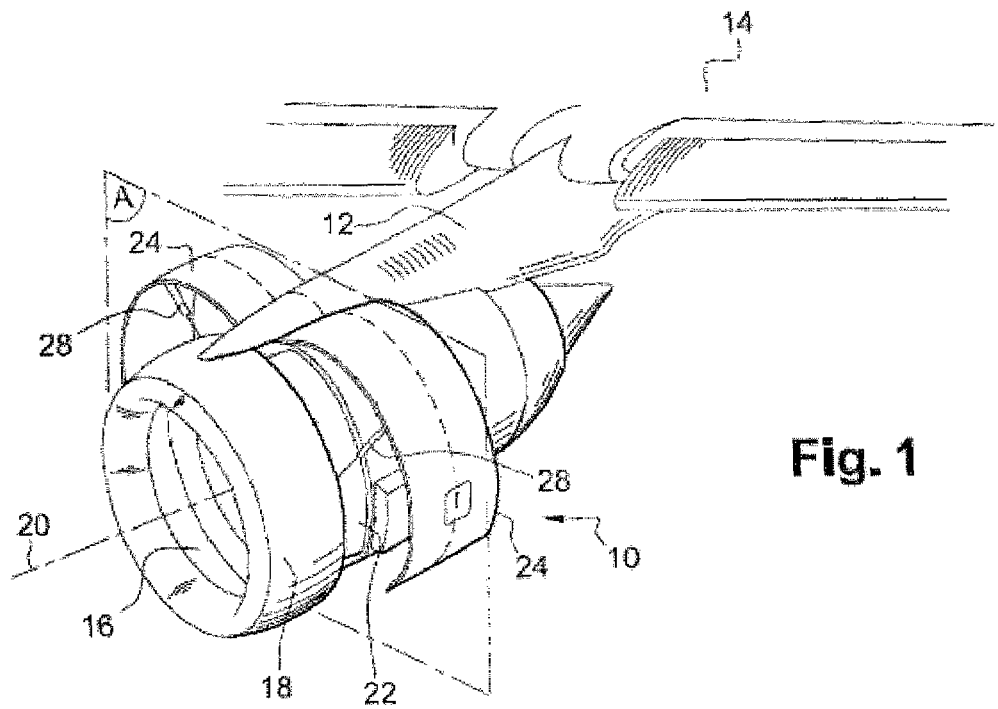
Figure 2:
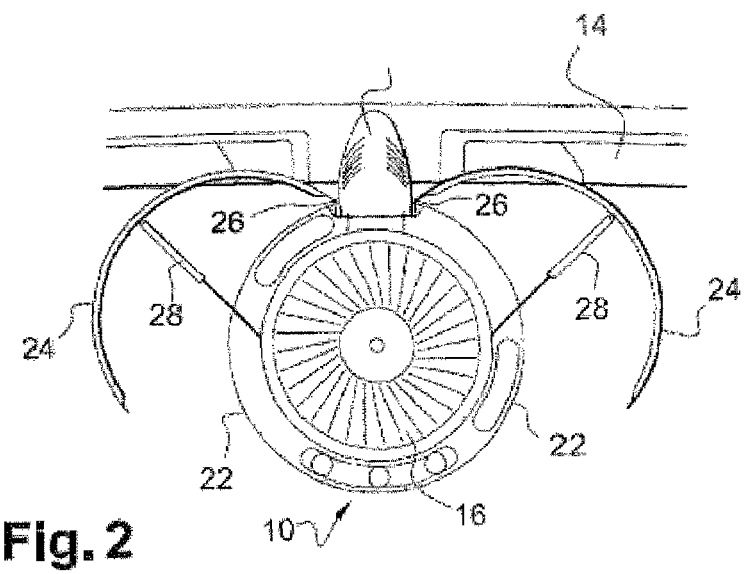

In FIGS. 1 and 2, a nacelle that is connected by a mast 12 to a wing 14 is shown at 10, whereby said nacelle comprises an air input 16 at the front and a lateral fuselage 18 with a longitudinal axis 20. The nacelle 10 comprises at least one opening 22, preferably two openings located on each side, on both sides of the mast 12, each able to be blocked respectively by a door 24.

According to the prior art, each door 24 is hinged relative to the upper edge of the opening 22 and pivots around an axis 26 that is essentially parallel to the axis 20 of the nacelle, located close to the mast 12.

In addition, locking means are provided to keep the doors 24 closed. According to an embodiment, the lower ends of the doors are connected when the latter are in a position that is closed by locks (not shown).

Advantageously, as illustrated in FIG. 2, two stands 28 are provided to keep each door in the open position.

Even if this type of door is relatively simple and allows easy access to the elements that are mounted in the low part of the engine, it does not provide full satisfaction for the following reasons:

The positioning of the door in the open position facing the opening at the median part and the top part does not promote access to these parts. Thus, the operators should slide between the door and the engine by first bending down to pass under the panel of the door by taking the risk of being injured by hitting the edges of the door.

In addition, this opening method does not make it possible to ensure optimum safety of the operators. Actually, even if they are held by stands, the doors can suddenly close again, due in particular to wind gusts, and can injure the operator located between the door and the engine.

As illustrated in FIG. 1, the upper parts of the existing hinged doors have significant wind pickup although the structures of the doors are sized to resist wind gusts on the order of 100 Km/h. In fact, these constraints in the open position are much more important than those to which the doors in the closed position are subjected. Thus, the doors are sized for rare cases of use.

Finally, for a door of large dimensions, its handling operation may prove difficult, whereby the operator may have to lift said doors to produce the opening. Beyond certain dimensions, it is necessary to provide an onboard system to assist in opening and closing, complicating the design and increasing the weight installed on the aircraft.

In addition, certain units of propulsion systems, of large dimensions in particular, can be relatively close to other parts of the aircraft, with configurations that can generate interferences between the door in the open position and the wing or the leading edge slat in deployed position, or any other fixed or mobile surface. It is necessary in these cases to install protections that also add additional weight to the aircraft.

SUMMARY OF THE INVENTION

Also, this invention aims at remedying the drawbacks of the prior art by proposing a hinged device for a door of an aircraft nacelle that makes it possible to release the opening optimally and that makes the intervention of the operators more reliable.

For this purpose, the invention has as its object a hinged device for at least one door of an aircraft nacelle, whereby said door is able to block an opening that is made in the fairing of the nacelle, characterized in that it comprises a base to which is connected at least one door, able to occupy a first retracted state in which said base is located at least in part inside the nacelle and a second extended state in which said base is located outside the fairing of the nacelle so as to be able to move, in a direction that is essentially parallel to the longitudinal axis of the nacelle, outside of said nacelle by entraining said at least one door to release the opening at least in part.

BRIEF DESCRIPTION OF THE DRAWING FIGURES

Other characteristics and advantages will emerge from the following description of the invention, a description provided by way of example only, with regard to the accompanying drawings, in which:

FIG. 1 is a perspective view of an aircraft nacelle according to the prior art,

FIG. 2 is a cutaway along plane A of FIG. 1 of an aircraft nacelle according to the prior art, FIG. 3 is a perspective view of an aircraft nacelle according to the invention, FIGS. 4A and 4B are transversal cutaways illustrating the base supporting the doors respectively in a retracted position and an extended position, FIG. 5 is a longitudinal cutaway illustrating the base supporting the doors in extended position, FIGS. 6A to 6D are top half-views diagrammatically showing the different stages of opening the upper portion of a door, FIGS. 7A to 7D are side half-views diagrammatically showing the different stages of opening the lower portion of a door, FIGS. 8A to 8D are perspective views illustrating the movement of opening doors, FIGS. 9A to 9D are transversal cutaways diagrammatically showing the doors of the nacelle during the different stages of the opening, FIGS. 10A to 10D are perspective views illustrating by details a connecting rod holding a door (said door being transparent) during the different stages of the opening, and FIGS. 11A to 11D are perspective views illustrating by details a deformable parallelogram that supports the base during the different stages of the opening.

DETAILED DESCRIPTION OF THE INVENTION

In FIG. 3, a nacelle of an aircraft connected via a mast 32 to a wing 34 was shown at 30. In the direction of the streams of air, this nacelle comprises an air intake 36, an air output 38 connected by an outside wall or fairing 40 with essentially circular sections in planes that are perpendicular to the longitudinal axis 42 of the nacelle, whereby said nacelle comprises an engine. For the remainder of the description, the fairing will correspond to the real or imaginary outside jacket of the nacelle.

The invention, however, is not limited to this embodiment and covers all of the different variants on matters of connecting elements between the nacelle and the remainder of the aircraft, the anchoring zone of the nacelle, the shapes, the dimensions and the materials of the nacelle, the type of engine, and the location of the engine.

So as to be able to intervene inside the nacelle, under the fairing, and to have access to the engine, to its components and/or its accessories, the nacelle comprises at its fairing 40, at least one opening 44 that can be blocked by at least one moving part that is called a door below. Thus, the door or doors 46 are able to occupy a first position, called closed, in which they block the opening and essentially extend the fairing so as to reduce the disturbances at the level of the air flows around the nacelle, and another position, called open, in which they release the opening 44 at least in part, as illustrated in FIGS. 3 and 5.

According to a widely used embodiment, the nacelle comprises an opening 44 that extends from each side of the nacelle from the mast and under the nacelle and two corresponding doors 46.1 and 46.2 located on both sides of the mast, whereby the doors extend from the mast up to the lower portion of the nacelle.

According to a configuration, the opening 44 has lateral edges in planes that are essentially perpendicular to the longitudinal axis 42 of the nacelle, a front lateral edge 48 and a rear lateral edge 50 (in the direction of flow of the air in the nacelle) and upper edges 52 that are essentially parallel to the longitudinal axis 42 of the nacelle located close to the mast.

Preferably, the doors do not comprise thrust reversers and are located at the fairing zones of the nacelle not comprising thrust reversers to the extent that said reversers induce relatively significant stresses on the nacelle. In contrast, if the thrust reversers induce only weak stresses that are compatible with the door, they could be used with the latter.

So as to allow the relative movement of the doors 46.1 and 46.2 relative to the nacelle 30, hinged means are provided.

According to the invention, the hinged means comprise a base 54 to which are connected the two doors, able to occupy a first retracted state, as illustrated in FIG. 4A, in which it is used at least in part inside the nacelle and a second extended state, as illustrated in FIG. 4B, in which the base 54 is located outside the fairing of the nacelle so as to be able to move outside the nacelle, essentially parallel to the longitudinal axis 42, as illustrated in FIG. 5, by entraining the doors 46.1 and 46.2, so that the latter release the opening 44 at least in part.

Advantageously, the base 54 is located in the low part of the nacelle and constitutes a portion of the fairing and comprises on each side, in a symmetrical manner, a joint 56 in the form of a pivoting axis that is essentially parallel to the longitudinal axis 42 that respectively connects the doors 46.1 and 46.2 to said base 54.

According to other variants, it would be possible to envisage a base and a single door or two bases each supporting a door.

So as to obtain a better distribution of stresses, the elements are essentially symmetrical relative to the vertical longitudinal median plane of the nacelle.

According to a characteristic of the invention, the base is connected to the nacelle by means of at least one connecting element of which a first end is connected to the nacelle and a second end is connected to the base, whereby at least one of the two ends is able to slide along a slide (or a rail) that is integral with the nacelle and/or the base.

According to an embodiment that is illustrated in FIGS. 4A, 4B and 5, the connecting means comprise a deformable parallelogram 58 that comprises two connecting elements 60.1 and 60.2 of which the first ends are connected to the nacelle and the second ends are able to slide along at least one slide 62 that is integral with the base 54, whereby the connecting elements 60.1 and 60.2 have suitable lengths so that the base can move outside the fairing in the extended state.

The first connecting element 60.1 (presented in detail in FIGS. 4B and 11C) comprises two struts 64 connected to the ends by two shafts, whereby the first shaft 66 pivots relative to two brackets 67 that are integral with the nacelle, essentially horizontal and perpendicular to the longitudinal axis 42, the second shaft 68 comprising at its ends rollers or small wheels 70 that can each move in a slide 62 that is integral with the base 54.

The second connecting element 60.2 is essentially identical to the first. It comprises two struts that are connected to the ends by two shafts, whereby the first shaft pivots relative to two brackets that are integral with the nacelle, essentially horizontal and perpendicular to the longitudinal axis 42, the second shaft comprising at its ends rollers or small wheels that can each move in a slide 62 that is integral with the base 54.

The second shafts 68 of the two connecting elements 60.1 and 60.2 are connected by a connecting rod 72 to increase the mechanical resistance of the connecting means between the base and the nacelle and to obtain a deformable parallelogram.

According to a preferred embodiment, the brackets that support the second element 60.2 are integral with the edge of one of the lateral edges of the opening, and the struts of said second element are bent so as to conform to the shapes of the edge when the doors are in the open position.

The slides 62 extend over essentially the entire length of the base (size along the longitudinal axis of the nacelle), which corresponds to the width of the doors and the opening.

At least one end-of-travel stop is provided for the slides 62, preferably one for each slide, against which the rollers 70 of the first connecting element are able to rest when the doors are in the open position.

The base 54 preferably moves toward the front of the nacelle to place the doors 46.1 and 46.2 to the front of the opening, as illustrated in FIG. 3.

In the upper part of the doors 46.1 and 46.2, each one of them comprises at least one connecting and holding element of which a first end is connected to the door and a second end is connected to the nacelle, whereby at least one of the two ends is able to slide along a slide 76 (or a rail) made at the door and/or the nacelle, whereby the length of the element is adapted to make it possible for the doors and the base to move outside the fairing.

According to an embodiment, for each door, the connecting and holding element comprises a connecting rod 78 that is connected to a first end to the nacelle via a ball-joint connection 80, or an essentially vertical pivoting axis and comprising at the other end a roller or a small wheel 82 that can move along a slide 76 that is integral with the door.

The slides 76 extend at the upper edge and over the entire width of the door 46.1 or 46.2.

The connecting rods 78 make it possible to limit the deflection of the doors when they are unlocked and participate in taking up stresses created by the weight of the doors and the base.

Advantageously, locking means are provided to keep the doors in locked position, for example locks.

According to an embodiment, the upper edges 52 comprise grooves that can accommodate the upper edges of the doors 46.1 and 46.2 designed to be able to be inserted in said grooves. In addition, centering pieces can be provided to ensure better positioning of the doors before the locking. For each door, locks, forcing the door in a radial manner, hold it in the corresponding groove.

Advantageously, locking means are provided to keep the doors in the open position, in particular by placing the lock in the slide 62, making it possible to immobilize at least one of the rollers 70.

According to a first simplified operating method, when the doors 46.1 and 46.2 are unlocked, they tend to separate and to shift downward from themselves by gravity. The base 54 no longer being held by the doors, the parallelogram 58 can be deformed, which produces a movement of the base downward and forward. At this moment, the base and the doors are located outside of the fairing, although an operator can move the unit toward the front so as to release the opening 44.

According to the variants, the translational movement can be manual or motorized, for example using a rack that is integral with the base, entrained in translation by a pinion that is itself entrained in rotation by an engine that is integral with the nacelle.

According to another method of operation illustrated in the figures, the movement of deformation of the parallelogram 58 is controlled by an actuator (not shown) so as to decompose the opening movement and to facilitate the closing, and more particularly the locking of the doors.

As illustrated in FIGS. 6A, 7A, 8A, 9A, 10A, and 11A, when the doors are locked in the closed position, the outside surfaces of said doors and of the base are located in the extension of the outside surface of the fairing so as to reduce the disturbance phenomena of the streams flowing around the nacelle. As illustrated in the FIGS. 6A and 10A, the connecting rods 78 are located essentially parallel to the upper edges of the opening. The deformable parallelogram 58 is in the position that corresponds to the retracted position of the base 54, as illustrated in FIG. 11A.

When the doors are unlocked, the doors open by themselves by gravity, as illustrated in FIGS. 8B and 9B. They are held by the connecting rods 78. As illustrated in FIGS. 7B and 9B, the base 54 is always in the retracted position, whereby the deformable parallelogram is held in this position by the actuator.

During this movement, the connecting rods 78 pivot along the vertical pivoting axis 80 and the rollers 82 move in the slide 76 made close to the upper edge of each door until striking the end of said slide 76, as illustrated in FIGS. 6B and 10B. Preferably, for each door, the anchoring point to the nacelle of the first end of the connecting rod 78 is offset relative to the end of the slide 76 against which the rollers 82 strike. The connecting rod 78 thereby is not perpendicular to the longitudinal axis 42 and forms an angle of less than 90° relative to its position folded along the upper edge 52 of the opening. This arrangement makes it possible to be able to reclose the door without needing to guide the movement of the connecting rod, which would have been the case if the connecting rod 78 had formed an angle greater than 90°.

Below, as illustrated in FIGS. 4B, 7C and 11C, the actuator creates the deformation of the parallelogram 58, which produces the movement downward and forward of the base 54. The doors having slightly advanced, entrained by the base, the connecting rods 78 are no longer abutted against the end of the rail and are located at an angle of more than 90° (essentially equal to 90° in FIGS. 6C and 6D) relative to the longitudinal axis 42, as illustrated in the FIGS. 6C and 10C, deploying the doors to the maximum. To keep the doors as far apart as possible, it is possible to provide a spring device that tends to keep the connecting rods 78 at an angle of greater than 90°.

Following these movements, the base and the doors are extended from the fairing lines of the nacelle.

The doors and the base are then moved forward, as illustrated in FIG. 5, until the opening is released. This movement can be obtained in a manual or assisted manner.

The lengths of the slides 62 and 76 are adjusted so that the doors are located at the front of the opening and release it completely.

Preferably, for each door, the length of the slide 76 is adjusted so that the roller 82 of the connecting rod 78 abuts against its end when the doors are in the open position. The doors thereby close a little and the connecting rods 78 incline, as illustrated in FIGS. 6D and 10D, so as to take up a portion of the stresses due to the offset of the doors forward which makes it possible to relieve the deformable parallelogram supporting the base.

Buffers can be provided on the inside surface of the doors so that the latter do not damage the fairing of the nacelle.

Advantageously, a locking system is operated so as to keep the doors open. To close the doors, it is advisable to reproduce the stages mentioned above in reverse order.

It is noted that when the base returns to retracted position, the doors are located again to the right of the opening and the connecting rods 78 form an angle that is less than 90° relative to their position that is folded along the upper edge of the opening. The closing of the doors is then done simply by pushing above.

The hinged device according to the invention, combined with the door of the nacelle, makes it possible to avoid the installation of systems for assistance with the opening and the closing, to minimize the conditions of structural dimensioning and therefore to make possible a corresponding weight gain. Finally, besides its release, it makes possible configurations close to the wings and/or leading edge slat of the wings without the risk of interference and therefore without need of protection systems to warn against damage due to contact between the door and other elements of the aircraft.

The invention claimed is:

1. A hinged device for at least one door (46.1, 46.2) of an aircraft nacelle (40), said at least one door being able to block an opening (44) that is made in a fairing of the nacelle, wherein said hinged device comprises a base (54) located in a low part of the nacelle to which is connected said at least one door by a pivoting axis (56), said pivoting axis (56) being essentially parallel to a longitudinal axis (42) of the nacelle, said base (54) being able to occupy a first retracted state in which said base (54) is located at least in part inside the nacelle and a second extended state in which said base (54) is located outside the fairing of the nacelle so as to be able to move, in a direction that is essentially parallel to the longitudinal axis of the nacelle, outside of said nacelle by entraining said at least one door (46.1, 46.2) so that movement of the base causes the at least one door to provide access to the opening, wherein said hinged device further comprises at least one connecting and holding element of which a first end is connected to said at least one door and a second end is connected to the nacelle, and at least one of the first and second ends of said at least one connecting and holding element is able to slide along a slide that is made at said at least one door.

2. The hinged device for at least one door of an aircraft nacelle according to claim 1, wherein said at least one connecting and holding element comprises a connecting rod (78) that is connected at a first end to the nacelle and comprises at the second end a roller (82) that can move along the slide (76) that is integral with the at least one door.

3. The hinged device for at least one door of an aircraft nacelle according to claim 1, wherein said base (54) is connected to the nacelle by means of at least one connecting element of which a first end is connected to the nacelle and a second end is connected to said base, whereby at least one of the two ends is able to slide along a slide that is integral with the base.

4. The hinged device for at least one door of an aircraft nacelle according to claim 3, wherein said at least one connecting element is in the form of a deformable parallelogram (58) that includes two connecting elements (60.1, 60.2) whose first ends are connected to the nacelle and whose second ends are able to slide along at least one slide (62) that is integral with said base (54), whereby the connecting elements (60.1, 60.2) have lengths that are adapted so that the base (54) can move outside the fairing in the extended state.

5. The hinged device for at least one door of an aircraft nacelle according to claim 4, wherein said opening comprises a front lateral edge parallel with a lateral axis and wherein one of the two connecting elements (60.1, 60.2) is connected at said front lateral edge (48) of the opening of the nacelle so that said base (54) moves toward a front of a nacelle.

6. An aircraft nacelle, comprising:

at least one opening (44) that can be blocked by at least one door, said at least one door being connected to the nacelle by a hinged device wherein said hinged device comprises a base (54) located in a low part of the nacelle to which is connected said at least one door by a pivoting axis (56), said pivoting axis (56) being essentially parallel to a longitudinal axis (42) of the nacelle, said base (54) being able to occupy a first retracted state in which said base (54) is located at least in part inside the nacelle and a second extended state in which said base (54) is located outside a fairing of the nacelle so as to be able to move, in a direction that is essentially parallel to the longitudinal axis of the nacelle, outside of said nacelle by entraining said at least one door (46.1, 46.2), so that movement of the base causes the at least one door to provide access to the opening.

7. The aircraft nacelle according to claim 6, wherein the base (54) is connected to the nacelle by at least one connecting element comprising a deformable parallelogram.

8. The aircraft nacelle according to claim 6, wherein said at least one door (46.1, 46.2) is connected to the nacelle via at least one connecting and holding element that comes in a form of a connecting rod (78) that is connected at a first end to the nacelle and that comprises at an other end a roller (82) that can move along a slide (76) that is integral with the at least one door and wherein the anchoring point to the nacelle of a first end of the connecting rod (78) is offset relative to an end of the slide (76) against which the roller (82) is able to abut.

9. The aircraft nacelle according to claim 6, wherein said at least one door (46.1, 46.2) is connected to the nacelle via at least one connecting and holding element that comes in a form of a connecting rod (78) that is connected at a first end to the nacelle and that comprises at an other end a roller (82) that is able to move along a slide (76) that is integral with the at least one door and wherein a length of the slide is adjusted so that the roller (82) of the connecting rod (78) abuts against its end when the at least one door is in an open position in which the opening is released at least in part.

* * * * *